United States Patent [19]

Kaneko et al.

[11] 4,093,320
[45] June 6, 1978

[54] GROOVED SPHERICAL BEARING FOR VERTICAL MACHINES

[75] Inventors: Ryoichi Kaneko; Katutosi Nii; Hiroo Hiroyama; Kinpei Okano, all of Hitachi, Japan

[73] Assignee: Hitachi, Ltd., Japan

[21] Appl. No.: 629,623

[22] Filed: Nov. 5, 1975

[30] Foreign Application Priority Data

Nov. 8, 1974   Japan .................................. 49-127993

[51] Int. Cl.² ............................................. F16C 32/06
[52] U.S. Cl. .......................................................... 308/9
[58] Field of Search ....................... 308/72, 9; 29/149.5; 204/143 R

[56] References Cited

U.S. PATENT DOCUMENTS 3,376,083  4/1968  Muijderman .......................... 308/172
3,927,921  12/1975  Woolley .................................. 308/72

FOREIGN PATENT DOCUMENTS 9,854   1962  Japan.

OTHER PUBLICATIONS

E. A. Muijderman "Spiral Groove Bearings", 1966, Philips Technical Library, pp. 116–122.

*Primary Examiner*—Richard A. Bertsch
*Attorney, Agent, or Firm*—Craig & Antonelli

[57] ABSTRACT

A bearing consisting of a pivot having a semi-spherical or hemi-spherical end portion formed with helical grooves and immersed in lubricating oil, and a cup bearing element also immersed in lubricating oil for supporting the pivot. A plurality of helical grooves disposed on the semi-pherical end portion are formed and arranged such that the lubricating oil is supplied under pressure to sliding surfaces of the pivot and the cup bearing element. An annular recess is formed on the intake side of the grooves.

19 Claims, 4 Drawing Figures

GROOVED SPHERICAL BEARING FOR VERTICAL MACHINES

BACKGROUND OF THE INVENTION

This invention relates to a grooved spherical bearing for vertical machines (particularly those whose number of revolutions is in a range between 20,000 and 50,000 r.p.m.) which is adapted to increase the quantity of lubricating oil circulating past the sliding surfaces of the bearing.

A grooved spherical bearing for bearing a vertical machine is characterized by being able to simultaneously bear both thrust and radial loads, having a high loading capacity, and being relatively low in bearing loss. Because of this characterizing features, it is used as a bearing device for a high-speed rotary machine, e.g. a centrifugal separator.

This type of bearing consists of a pivot or a rotatable member having a spherical end portion, and a cup bearing element or a stationary member concentric with the pivot and semi-spherically or hemi-spherically concave in shape, with a gap being formed between the rotatable member and the stationary member. The cup bearing element and the spherical end portion of the pivot are immersed in lubricating oil contained in an oil tank, and a plurality of grooves formed on the surface of the spherical end portion of the pivot disposed in spaced juxtaposed relation to the cup bearing element are arranged on the entire surface of the spherical end portion in such a manner that the grooves perform the function of the blades of a pump as the pivot rotates. Thus, when the pivot rotates, the pooled oil in the oil tank is drawn through the intake (the end of each groove remote from the end of the spherical end portion) into the gap by the pumping action of the grooves, so that the pressure of the oil film formed in the gap by the lubricating oil is increased in supporting the bearing load.

This type of bearing has oil film characteristics which vary from those of other types of bearing in that the thickness of the oil film increases with an increase in the number of revolutions, is maximized when the number of revolutions reaches a certain level, and rapidly decreases after the number of revolutions exceeds this level. It is empirically known that, because of these characteristics, the temperature of the bearing rapidly rises and the bearing becomes unfit for use when the number of revolutions exceeds a certain level, in case the bearing is used with a machine rotating at high speeds, e.g. a centrifugal separator handling gases. It has in the past been believed that this phenomenon is due to a lowering in the viscosity of the lubricating oil caused by an increase in bearing load. Attempts have been made, therefore, to effect cooling of the bearing so as to avoid a lowering in the viscosity of lubricating oil. However, no satisfactory results have been achieved by these attempts.

Inventors have conducted research into the behavior of the pooled oil disposed in the vicinity of the intake of each groove of this type of bearing when the shaft supported by the bearing rotates at high speeds. The results show that the lubricating oil in this region is caused by the force of inertia to flow in a radial direction and that this stream of lubricating oil prevents the pooled oil from being drawn through the intake of each groove into the gap. Thus it has been ascertained that the formation of the radial flow of the oil prevents the oil from being drawn into the gap and causes a reduction in the thickness of the oil film, thereby resulting in a sudden rise in the temperature of the bearing. Unless operation of the machine is interrupted at this stage, the bearing will develop seizure, making further operation of the machine impossible.

SUMMARY OF THE INVENTION

An object of the present invention is to provide a grooved spherical bearing for vertical machines in which the quantity of lubricating oil circulating past the sliding surfaces of the bearing is increased.

Another object of the invention is to provide a grooved spherical bearing for vertical machines which can withstand high speed rotation of the shaft.

Still another object of the invention is to provide a grooved spherical bearing for vertical machines which is capable of avoiding a reduction in the loading capacity of an oil film formed by lubricating oil.

The outstanding characteristic of the invention is that an open space common to all the grooves is formed on the intake side of each of a plurality of helical grooves formed on the semi-spherical or hemi-spherical end portion of a pivot which is immersed in lubricating oil and which forms a pair with a cup bearing element bearing the pivot.

DESCRIPTION OF THE PREFERRED EMBODIMENTS

Figure 1:
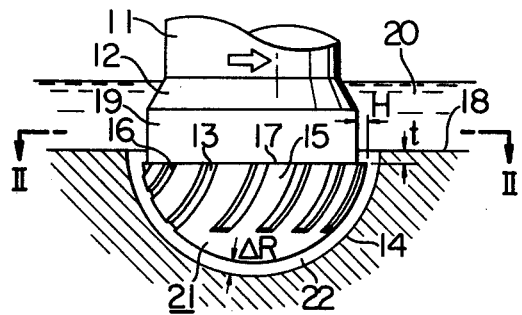
FIG. 1 is a side view of the grooved spherical bearing for vertical machines comprising one embodiment of the present invention.

The invention will now be described in detail with reference to FIG. 1 to FIG. 4. In FIG. 1, 11 is a shaft, and 12 a conical end. 13 refers to a plurality of grooves. 14 is a cup bearing element. 15 refers to ledges or shoulders between the grooves 13. 16 is an intake of each groove 13. 17 is an end of each ledge 15. 18 is an upper surface of the cup bearing element 14. 19 is a cylindrical portion. 20 is pooled oil. 21 is a semi-spherical or hemi-spherical end portion, and 22 a gap formed between the end portion 21 and the cup bearing element 14.

The shaft 11 is connected at its lower end to the semi-spherical end portion 21 which is slidably fitted in the cup bearing element 14, the semi-spherical end portion 21 and the cup bearing element 14 being spaced apart from each other by the gap 22 of a predetermined size. The grooves 13 spaced apart from one another a predetermined distance are formed on the surface of the semi-spherical end portion 21 and arranged circumferentially thereof. Disposed on the cup bearing element 14 is the pooled oil 20 in which the semi-spherical portion of the cup bearing element 14 and the semi-spherical end portion 21 are immersed. The grooves 13 formed on the semi-spherical end portion 21 are constructed such that they perform the function of the blades of a pump to draw the pooled oil 20 into the gap 22 as the shaft 11 rotates. The opposite end portions of grooves 13 are aligned radially. The end 17 of each ledge 15 which is flush with the end of each groove 13 is disposed at a level which is lower by a height $t$ than the upper surface of the cup bearing element 14. Contiguous with the upper end of the semi-spherical end portion 21 and disposed remote therefrom as seen from the gap 22 in which the sliding surfaces of the end portion 21 and the cup bearing element 14 are disposed is a cylindrical portion 19 whose outer periphery is disposed inwardly of the end 17 of each ledge 15 by a distance H. The cylindrical portion 19 is contiguous with the conical end 12 which in turn is contiguous with the shaft 11, so that the portion interposed between the shaft 11 and the cylindrical portion 19 is tapered.

The distance H by which the cylindrical portion 19 is disposed inwardly of the upper end 17 of each ledge 15 may be decided by taking into consideration the conditions of rotation of the shaft 11, the kind of the lubricating oil used and other factors. Generally, however, the value of the distance H is higher than the value of the depth $h$ of the grooves (usually, H is about 0.1 millimeter). By this arrangement, it is possible to prevent the lubricating oil disposed near the intake 16 of each groove 13 from being caused by the force of inertia to form a radial flow at the upper end of each groove 13 and thereby obturating the intake 16 of each groove 13.

Figure 2:
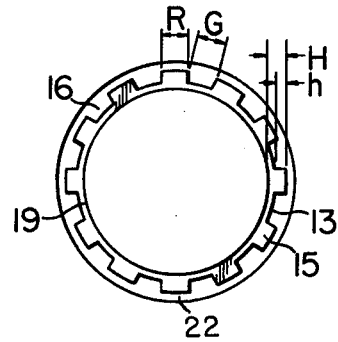
FIG. 2 is a sectional view seen in the direction of arrows II — II of FIG. 1.

The semi-spherical end portion 21 and the cup bearing element 14 of this bearing are designed such that they move to a concentric position when under steady loading, although the cup bearing element 14 has a radius which is larger than that of the semi-spherical end portion 21 by $\Delta R$ which is equal to the size of the gap 22. Preferably, the semi-spherical end portion 21 is designed such that the ledges 15 and grooves 13 have circumferential widths R and G respectively which are equal to each other as shown in FIG. 2. In the case of a bearing of this type having a size of ⅜ inch, the optimum values of $\Delta H$, $t$ and are 0.5 millimeter and 0.1 millimeter respectively.

Figure 3:
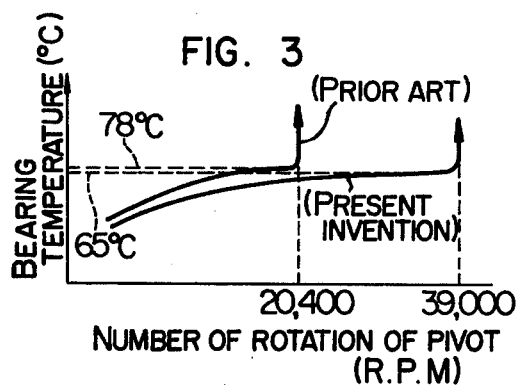
FIG. 3 is a graph showing the characteristics of the bearing according to the invention in comparison with those of a bearing of the prior art.

FIG. 3 shows the results of tests in which the bearing of the present invention is compared with a bearing of the prior art with respect to the number of revolutions-bearing temperature characteristics. In the tests, the grooved spherical bearings of a size of ⅜ inch were used in trifluorochloroethylene-base oil under a load of 8 Kg without cooling the bearing with water. It will be seen that, when the bearing of the prior art is used, the bearing temperature shows a sudden increase from 78° C at 20,400 r.p.m., while in case of the bearing of the invention having the values above for $\Delta$, $t$, and H for the ⅜ inch bearing the bearing temperature shows a sudden rise from 65° C at 39,000 r.p.m. Thus the invention provides marked improvements in the performance of the bearing.

Figure 4:
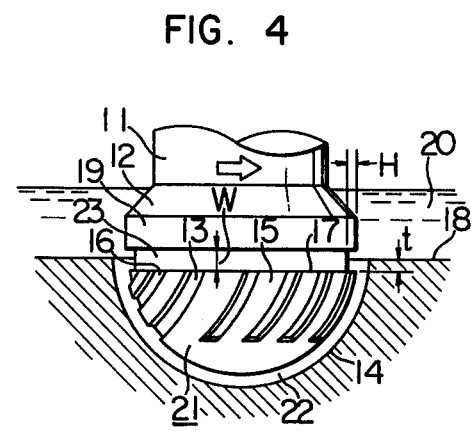
FIG. 4 is a side view of the grooved spherical bearing for vertical machines comprising another embodiment of the invention.

FIG. 4 shows another embodiment of the invention. The differences between the embodiments shown in FIG. 1 and FIG. 4 will be described. The cylindrical portion 19 of the embodiment shown in FIG. 4 has a larger diameter than the cylindrical portion 19 of the embodiment shown in FIG. 1, and an annular recess 23 is formed between the cylindrical portion 19 and the upper end 17 of each ledge 15. The annular recess 23 has a diameter which is equal to that of the cylindrical portion 19 shown in FIG. 1. Thus the diameter of the recess 23 is smaller than that of the semi-spherical end portion 21 by 2H. The annular recess 23 preferably has a width W which is in a range between 5 and 10 millimeters.

By this arrangement, the pooled oil 20 is drawn through the grooves 13 into the gap 22 by the action of the grooves 13 while forming a pressurized oil film on the outer surface of the semi-spherical end portion 21 as the shaft 11 rotates, as is the case with the embodiment shown in FIG. 1. When the flow of lubricating oil moving through the gap 22 reaches the end of the end portion 21, it changes its direction of movement and moves upwardly along the surface of the cup bearing element 14 to be finally released through the intake 16 of each groove 13.

As the flow rate of the pressurized oil increases, the frequency with which the old oil films on the loaded surfaces of the bearing are replaced by a new oil film will also increase, with the result that the bearing surfaces are covered with pressurized oil films at all times during operation of the machine. Thus the bearing surfaces are protected against the load by the oil films at all times.

We claim:

1. A grooved spherical bearing for vertical machines comprising:
   a rotatable member including a semi-spherical end portion;
   a stationary member for bearing said semi-spherical end portion of said rotatable member;
   a plurality of grooves formed on the surface of said semi-spherical end portion of said rotatable member, said surface adapted to be brought into sliding contact with the surface of said stationary member, said grooves being arranged such that they perform the function of drawing lubricating oil, in which said semi-spherical end portion and said stationary member are immersed, toward the sliding surfaces of the two members as said rotatable member rotates;
   means for reducing resistance of the lubricating oil flow directed along the sliding surfaces caused by a flow of the lubricating oil being radially forced by inertia of said rotatable member, and wherein each of said plurality of grooves has an intake portion for said lubricating oil disposed at a major diameter surface of said semi-spherical end portion and an outlet portion for said lubricating oil disposed at a minor diameter surface of said semi-spherical end portion, and wherein said resistance reducing means includes an edge portion of said stationary bearing member extending in an axial direction of said rotatable member by a predetermined distance upstream of said intake portion.

2. A bearing according to claim 1, wherein said means for axially flowing further include said rotatable member having a cylindrical member connected to said semi-spherical end portion with a diameter less than the diameter of the depth of said grooves at said intake portion by a predetermined amount.

3. A bearing according to claim 1, wherein said means for axially flowing further include said rotatable member having a cylindrical member connected to said semi-spherical end portion, said cylindrical member having a first diameter greater than said major diameter of said semi-spherical end portion and a second diameter adjacent said intake portion being less than the diameter of the depth of said grooves at said intake portion, thereby forming an annular groove in said cylindrical member at said intake portion.

4. A bearing according to claim 1, wherein said plurality of grooves are separated from one another in the circumferential direction by the same dimension as the width of each of said grooves.

5. A grooved spherical bearing for vertical machines comprising:
   a rotatable member including a semi-spherical end portion;
   a stationary member for bearing said semi-spherical end portion of said rotatable member;
   a plurality of grooves formed on the surface of said semi-spherical end portion of said rotatable member, said surface adapted to be brought into sliding contact with the surface of said stationary member, said grooves being arranged such that they perform the function of drawing lubricating oil, in which said semi-spherical lower end portion and said stationary member are immersed, toward the sliding surfaces of the two members as said rotatable member rotates; and
   means for preventing lubricating oil flow directed along the sliding surfaces from flow in a radial direction of said rotatable member, wherein each of said plurality of grooves has an intake portion for said lubricating oil disposed at a major diameter surface of said semi-spherical end portion and an outlet portion for said lubricating oil disposed at a minor diameter surface of said semi-spherical end portion, and wherein said radial oil flow preventing means include an edge portion of said stationary bearing member extending in said axial direction by a predetermined distance upstream of said intake portion in the direction of said lubricating oil flow.

6. A bearing according to claim 5, wherein said means for axially flowing further include said rotatable member having a cylindrical member connected to said semi-spherical end portion with a diameter less than the diameter of the depth of said grooves at said intake portion by a predetermined amount.

7. A bearing according to claim 5, wherein said means for axially flowing further include said rotatable member having a cylindrical member connected to said semi-spherical end portion, said cylindrical member having a first diameter greater than said major diameter of said semi-spherical end portion and a second diameter adjacent said intake portion being less than the diameter of the depth of said grooves at said intake portion, thereby forming an annular groove in said cylindrical member at said intake portion.

8. A bearing according to claim 5, wherein said plurality of grooves are separated from one another in the circumferential direction by the same dimension as the width of each of said grooves.

9. A grooved spherical bearing for vertical machines comprising:
   a pivot including a semi-spherical end portion;
   a semi-spherical cup bearing element for bearing said semi-spherical end portion of said pivot;
   a plurality of grooves formed on the surface of said semi-spherical end portion of said pivot, said surface adapted to be brought into sliding contact with the surface of said semi-spherical cup bearing element, each of said grooves having an intake for lubricating oil disposed at a major diameter edge of said semi-spherical end portion and an outlet therefor disposed at a minor diameter edge thereof, whereby the lubricating oil can be made to move along each groove from its intake to its outlet by force of inertia produced by the rotation of the pivot;
   a shoulder disposed adjacent the intakes of the grooves, said shoulder being formed in the pivot by cutting off an edge portion of the pivot which is disposed opposite to the grooves whereby the intakes can open in the axial direction of the pivot,
   and further comprising an edge portion of said cup bearing element extending in an axial direction of said pivot by a predetermined distance upstream of said intake in the direction of said lubricating oil flow.

10. A bearing according to claim 9, wherein said pivot has a diameter less than the diameter of the depth of said grooves at said intake by a predetermined amount.

11. A bearing according to claim 9, wherein said shoulder forms an annular groove at said intake with a cylindrical portion of said pivot having a first diameter greater than said major diameter of said semi-spherical end portion, said annular groove having a second diameter adjacent said intake being less than the diameter of the depth of said grooves at said intake portion by a predetermined amount.

12. A bearing according to claim 3, wherein said plurality of grooves are separated from one another in the circumferential direction by the same dimension as the width of each of said grooves.

13. A grooved spherical bearing for vertical machines comprising:
   a pivot including a semi-spherical end portion;
   a semi-spherical cup bearing element for bearing said semi-spherical end portion of said pivot;
   a plurality of grooves formed on the surface of said semi-spherical end portion of said pivot, said surface adapted to be brought into sliding contact with the surface of said semi-spherical cup bearing element, each of said grooves having an intake for lubricating oil disposed at a major diameter edge of said semi-spherical end portion and an outlet therefor disposed at a minor diameter edge thereof whereby the lubricating oil can be made to move along each groove from its intake to its outlet by the force of inertia produced by the rotation of the pivot, an edge portion of said cup bearing element extending in an axial direction of said pivot by a predetermined distance upstream of said intake for lubricating oil in the direction of lubricating oil flow; and
   an annular recess disposed adjacent the intakes of the grooves, said recess being formed by cutting off an edge portion of the pivot disposed adjacent the intakes of the grooves.

14. A bearing according to claim 3, wherein said annular groove is formed with a cylindrical member of said pivot connected to said semi-spherical end portion, said cylindrical member having a first diameter greater than said major diameter of said semi-spherical end portion, and said annular groove having a second diameter adjacent said intake portion being less than the diameter of the depth of said grooves at said intake.

15. A bearing according to claim 13, wherein said plurality of grooves are separated from one another in the circumferential direction by the same dimension as the width of each of said grooves.

16. A grooved spherical bearing for vertical machines comprising:
   a pivot including a semi-spherical end portion;

a semi-spherically concaved bearing element for bearing said semi-spherical end portions of said pivot;

a plurality of helical grooves formed on the surfaces of said semi-spherical end portion of said pivot, said grooves being arranged relative to one another such that they are superimposed on the surface of the semi-spherically concaved bearing element adapted to be brought into sliding engagement with the surface of the semi-spherical end portion of the pivot as said pivot rotates, said helical grooves having a circumferential width which is equal to the circumferential distance between the grooves, said helical grooves tilting in the direction of rotation of said pivot and each being formed with an intake for lubricating oil at the largest diameter edge thereof; and a cylindrical portion which forms a part of said pivot, said cylindrical portion being provided by cutting off an edge portion of the pivot such that the intakes for lubricating oil of said helical grooves may open along the axis of the pivot, said cylindrical portion having a diameter which is smaller than the diameter of the portion of the semi-spherical end portion in which the intakes of the helical grooves are disposed, and wherein said concaved bearing element is provided with an edge portion which extends in an axial direction of said pivot by a predetermined distance upstream of said intake in the direction of lubricating oil flow.

17. A bearing according to claim 16, wherein said cylindrical portion has a diameter less than the diameter of the semi-spherical end portion at said intakes by a predetermined amount.

18. A bearing according to claim 16, wherein said cylindrical portion forms an annular groove with a second cylindrical portion of said pivot having a diameter greater than said largest diameter of said semi-spherical end portion at said intakes.

19. A bearing according to claim 16, wherein said plurality of grooves are separated from one another in the circumferential direction by the same dimension as the width of each of said grooves.

* * * * *